United States Patent [19]

Adiletta

[11] Patent Number: 5,470,364
[45] Date of Patent: Nov. 28, 1995

[54] REGENERABLE DIESEL EXHAUST FILTER

[75] Inventor: Joseph G. Adiletta, Thompson, Conn.

[73] Assignee: Pall Corporation, East Hills, N.Y.

[21] Appl. No.: 107,841

[22] PCT Filed: Jan. 7, 1993

[86] PCT No.: PCT/US93/00022

§ 371 Date: Aug. 24, 1993

§ 102(e) Date: Aug. 24, 1993

[87] PCT Pub. No.: WO93/13848

PCT Pub. Date: Jul. 22, 1993

Related U.S. Application Data

[63] Continuation-in-part of Ser. No. 817,595, Jan. 7, 1992, Pat. No. 5,228,891.

[51] Int. Cl.[6] .................................................. B01D 46/00
[52] U.S. Cl. ........................ 55/484; 55/523; 55/DIG. 30; 60/311
[58] Field of Search ............................ 55/282, 484, 487, 55/498, 502, 508, 511, 521, 523, DIG. 10, DIG. 30; 60/303, 311

[56] References Cited

U.S. PATENT DOCUMENTS

| | | |
|---|---|---|
| 2,192,968 | 3/1940 | Fieser . |
| 3,350,860 | 11/1967 | Grassell et al. ............................ 55/387 |
| 3,380,810 | 4/1968 | Hamblin ................................. 55/523 X |
| 4,129,429 | 12/1978 | Humbert, Jr. et al. .................... 55/484 |
| 4,149,862 | 4/1979 | Sewell, Sr. ............................ 55/498 X |
| 4,255,173 | 3/1981 | Mayer et al. ....................... 55/DIG. 30 |
| 4,264,344 | 4/1981 | Ludecke et al. ....................... 55/498 X |
| 4,276,066 | 6/1981 | Bly et al. ................................... 55/287 |
| 4,318,720 | 3/1982 | Hoggatt ............................... 55/498 X |
| 4,342,574 | 8/1982 | Fetzer ................................... 55/378 X |
| 4,415,344 | 11/1983 | Frost et al. ................................ 55/523 |
| 4,416,675 | 11/1983 | Montierth ................................. 55/502 |
| 4,455,823 | 6/1984 | Bly et al. .............................. 55/521 X |
| 4,504,294 | 3/1985 | Brighton ................................... 55/502 |
| 4,544,388 | 10/1985 | Rao et al. .......................... 55/DIG. 30 |
| 4,576,799 | 3/1986 | Wörner et al. ........................ 55/484 X |
| 4,626,265 | 12/1986 | Adiletta ................................ 55/473 X |
| 4,645,605 | 2/1987 | Durham .................................. 210/679 |
| 4,652,286 | 3/1987 | Kusuda et al. ........................... 55/523 |
| 4,687,579 | 8/1987 | Bergman ................................. 210/347 |
| 4,704,863 | 11/1987 | Abthoff et al. ........................... 60/311 |
| 4,718,926 | 1/1988 | Nakamoto et al. ....................... 55/523 |
| 4,720,972 | 1/1988 | Rao et al. ................................ 60/274 |
| 4,732,594 | 3/1988 | Mizrah et al. ............................ 55/523 |
| 4,791,785 | 12/1988 | Hudson et al. ........................... 60/303 |
| 4,801,317 | 1/1989 | Agnew et al. ........................... 55/500 |
| 4,813,231 | 3/1989 | Bykowski ............................ 55/523 X |
| 4,833,883 | 5/1989 | Oda et al. ................................ 60/311 |
| 4,858,431 | 8/1989 | Leonhard et al. ........................ 60/297 |
| 4,866,932 | 9/1989 | Morita et al. ............................ 60/288 |
| 4,872,889 | 10/1989 | Lepperhoff et al. ...................... 55/267 |
| 4,875,335 | 10/1989 | Arai et al. ................................ 60/274 |
| 4,877,433 | 10/1989 | Oshitari ................................... 55/486 |
| 4,895,707 | 1/1990 | Kühn ...................................... 422/177 |
| 4,923,487 | 5/1990 | Bogart et al. ........................ 55/484 X |
| 4,936,093 | 6/1990 | Goerlich .................................. 60/280 |
| 4,948,403 | 8/1990 | Lepperhoff ............................... 55/282 |
| 4,960,449 | 10/1990 | Yonushonis ............................. 55/523 |
| 4,979,364 | 12/1990 | Fleck ....................................... 60/274 |

(List continued on next page.)

FOREIGN PATENT DOCUMENTS

| | | |
|---|---|---|
| 0704092 | 2/1965 | Canada . |
| 0194131 | 9/1986 | European Pat. Off. . |
| 0779308 | 9/1935 | France . |
| 1453653 | 9/1966 | France ..................................... 55/484 |
| 56-148607 | 11/1981 | Japan . |
| WO92/18226 | 10/1992 | WIPO . |
| WO93/19288 | 9/1993 | WIPO . |

*Primary Examiner*—Robert Spitzer
*Attorney, Agent, or Firm*—Leydig, Voit & Mayer

[57] ABSTRACT

A rectangular parallel piped filter arrangement formed of inlet cells (40), outlet cells (42) and filter elements (57) compressed between impervious end plates (46, 48) which are integrally formed with inlet cells (40, 42). Each cell (40, 42) includes four frame members (40a–40d, 42a–42d). Also support elements (59) are provided on each side of the filter elements (57).

21 Claims, 11 Drawing Sheets

U.S. PATENT DOCUMENTS

| | | | |
|---|---|---|---|
| 5,053,062 | 10/1991 | Barris et al. | 55/282 |
| 5,082,478 | 1/1992 | Oono et al. | 55/DIG. 30 |
| 5,094,075 | 3/1992 | Berendes | 60/303 |
| 5,171,337 | 12/1992 | Pollock | 55/284 |
| 5,171,341 | 12/1992 | Merry | 55/484 |
| 5,228,891 | 7/1993 | Adiletta | 55/484 |
| 5,248,481 | 9/1993 | Bloom et al. | 55/484 X |
| 5,248,482 | 9/1993 | Bloom | 55/484 X |
| 5,258,164 | 11/1993 | Bloom et al. | 422/174 |

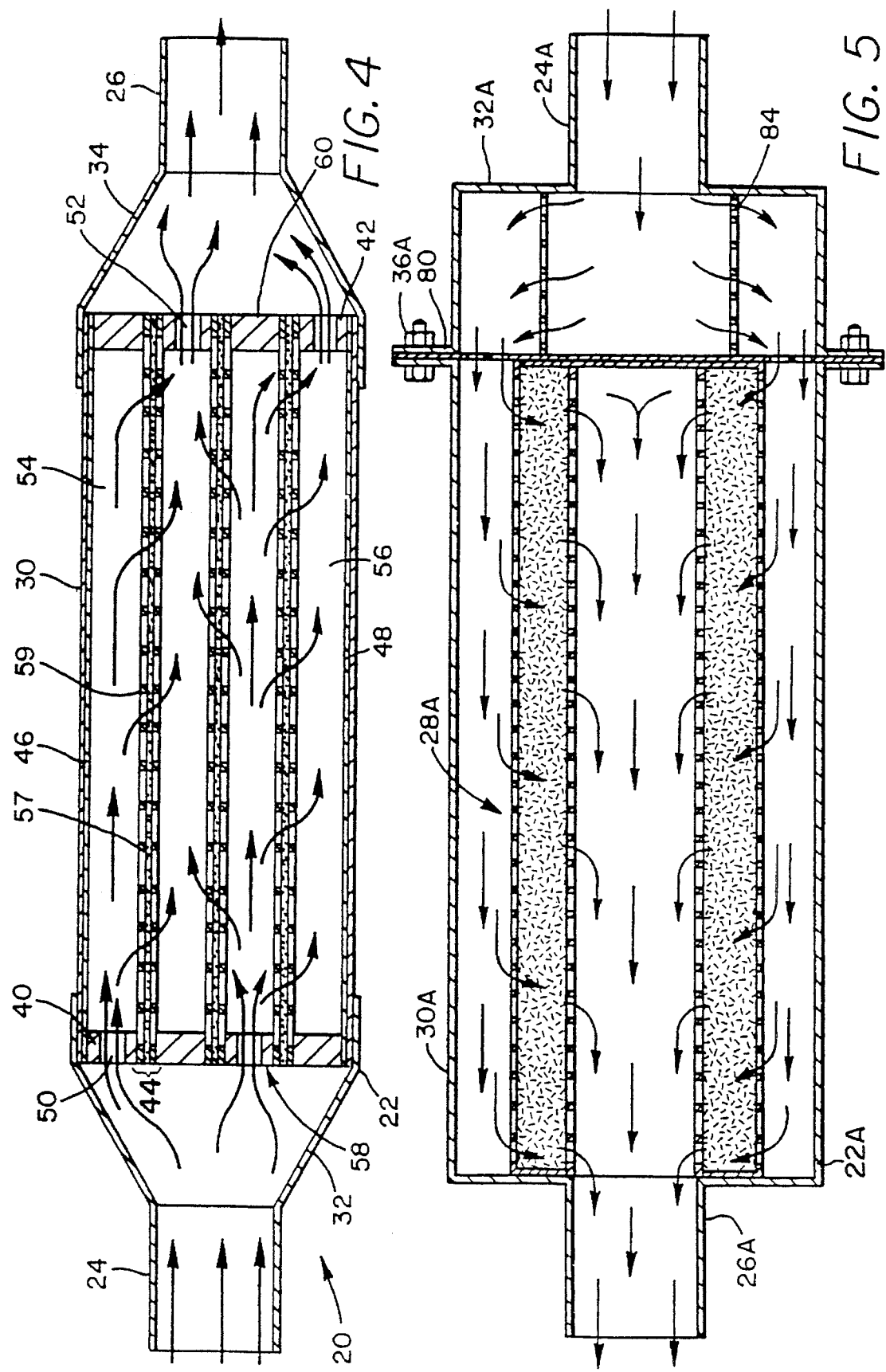

REGENERABLE DIESEL EXHAUST FILTER

This application is a national stage application of International Application No. PCT/US93/00022, with an international filing date of Jan. 7, 1993, which is a continuation-in-part of application Ser. No. 07/817,595 filed Jan. 7, 1992, now U.S. Pat. No. 5,228,891.

FIELD OF THE INVENTION

The present invention relates to a filter system for purifying the exhaust gases of an internal combustion engine. In particular, it relates to a regenerating filter for removing particulates from the exhaust gases of a diesel engine.

BACKGROUND OF THE INVENTION

There is an increasing awareness of the health hazards presented by many common air pollutants. Perhaps in response to these concerns, governments are increasingly regulating the exhaust emissions of vehicles. In the United States, Environmental Protection Agency requirements relate to the exhaust of vehicles, rather than the device or method used to control the exhaust. Two predominant methods are currently used to control emissions; they are the utilization of alternative fuels, and solid particulate removal, as with a filter.

In particular, diesel engines, such as those utilized in trucks, buses, and passenger cars, produce a tremendous amount of soot. As there are in excess of 1.2 million diesel-powered vehicles in the United States alone, diesel engines pose significant health and air pollution problems. Over the next several years, vehicles powered by such diesel engines must meet more and more stringent regulations. As a result, there is increasing interest in the efficient and effective limitation of emission of particulate material, generally carbon and hydrocarbon particles, from the exhaust gases of diesel engines.

Various types of filtering devices have been proposed to filter diesel engine exhaust. Usually, such devices comprises filter systems which retain and collect the particulates in the exhaust gas. As soot particles are reported to range in size upward from 250 A (0.25 micron), a high efficiency filter is required to effectively filter out such contaminants. A number of filters are known. For example, cellular ceramic filters and honeycomb filters of porous ceramic material, such as those disclosed in U.S. Pat. Nos. 4,872,889 and 4,948,403 to Lepperhoff et al., have been recognized as being useful in trapping particulates from exhaust emissions.

However, particulates retained in the filter generally lead to an increase in the flow resistance in the exhaust and a resultant increase in the back pressure of the exhaust. Excessive back pressure can develop quickly, particularly when high efficiency filters are utilized. This unacceptable increase in exhaust back pressure can lead to an increase in fuel consumption, and, in extreme cases, to engine shut-off or failure. This result is particularly troublesome with truck and bus diesel engines inasmuch as any filter of a practical size would quickly become loaded and develop high back pressure which would result in engine shut-off.

As a result, it is necessary to intermittently regenerate the filter to remove the carbon particles from the filter during operation of the diesel engine. This is generally accomplished by providing sufficient heat to combust the particulates. Consequently, filter materials must withstand temperatures of over 600° C. (1112° F.) repeatedly. A number of methods of regeneration are known, such as the utilization of electric heating elements, as disclosed in, for example, U.S. Pat. No. 5,053,062 to Barris et al., U.S. Pat. No. 4,791,785 to Hudson et al., and U.S. Pat. Nos. 4,872,889 and 4,948,403 to Lepperhoff et al. Another means of regenerating the filter includes turbo enriched fuel injection to raise the temperature in the filter to initiate auto-combustion of trapped soot particles. These methods may suffer, however, from difficulties in the ignition of deeply trapped soot particles during regeneration or require an excessive energy input to regenerate the filter material.

Ceramic honeycomb filter designs are particularly susceptible to rapid development of excessive back pressure. There are a number of additional disadvantages, however, associated with the use of ceramic materials. Ceramic materials, particularly filters, are inherently brittle, and, consequently, subject to fracture from shock and mechanical stresses. Therefore, when ceramic materials are used in filters, it is necessary to design the filters with greater depth thickness than ordinarily desirable. Further, because ceramic materials are fragile and not deformable, it is not feasible to utilize standard engineering edge-sealing, gasketing methods due to the heating that is required. Ceramics are also costly to manufacture as they are difficult to shape. Additionally, inasmuch as the uniformity of ceramic particles is difficult to control, particularly for sintering and pre-forming, manufacturing quality is difficult to control.

OBJECTS OF THE INVENTION

The general object of the invention is to provide an improved exhaust filter for diesel engines. A more particular object of the invention is to provide a reliable, high efficiency filter which provides a low change in pressure across the filter.

An additional object is to provide an exhaust filter that does not significantly impair engine performance. A related object is to provide an exhaust filter with reduced susceptibility to development of back pressure.

Another object is to provide an exhaust filter that is highly resistant to heat, and is regenerable.

A further object is to provide an exhaust filter of an uncomplicated design that may be easily serviced. A more specific object is to provide an exhaust filter that may be easily assembled and disassembled to facilitate maintenance or replacement of filter elements in the field.

Yet another object is to provide a diesel exhaust purification system which accommodates a large flow of gas but features a small, compact design.

Another object of the invention is to provide an exhaust filter assembly which facilitates the ignition of trapped soot particles during regeneration of the filter.

An additional object is to provide a modular diesel exhaust filter arrangement which may be sized to fit a variety of different engines.

BRIEF SUMMARY OF THE INVENTION

In accomplishing these objects, there is provided an improved diesel exhaust filter having a high efficiency, self-contained filter arrangement disposed within a housing that may be connected in-line with the exhaust system of the vehicle to provide a flow of exhaust gases therethrough. The housing, which may be of any appropriate shape, includes an inlet pipe, which may be connected to an exhaust pipe from the engine, and an outlet pipe, which may be open to the atmosphere. Disposed within the housing is a self-contained filtering means.

In one embodiment of the invention, the filtering means is a flat filter arrangement having inlet and outlet cells and filter elements compressed between opposite impervious endplates. Exhaust gas enters the inlet cells along the inlet end of the housing, flows through the filter elements, and out of the filter arrangement through the outlet cells to be exhausted to the atmosphere through the outlet pipe. Another embodiment of the invention comprises a housing having a rectangular plenum having an open top portion into which seats a topplate having substantially flat and upwardly and outwardly extending sides. This embodiment utilizes a flat filter arrangement, the components of which are compressed between the lower, inner surface of the plenum and the flat surface of the topplate by nuts and carriage bolts that extend through openings in the flat surface of the topplate, the lower surface of the plenum, and the components of the filter arrangement. Another embodiment of the invention comprises a similar flat filter arrangement, and housing comprising a plenum having dual components that are secured together along outwardly extending flanges by bolts. Flat plates, each having an outwardly extending pipe are secured to the ends of the plenum to seal the housing.

Another embodiment of the invention includes a housing having an inlet pipe and an outlet pipe, which defines an exhaust gas flow path through the housing, and a filter arrangement is disposed within the gas flow. The filtering arrangement includes a plurality of inlet cells, microporous filter elements and outlet cells, which are alternately arranged with at least one microporous filter element disposed between each inlet cell and adjacent outlet cell. A portion of the filter elements extend past the inlet and outlet cells. The inlet and outlet cells, and the microporous filter elements comprise materials that are resistant to high temperatures such that the filtering arrangement may be regenerated by heat.

In any of the embodiments of the present invention, the filter assembly may further include an insulating material coupled to the housing. The insulating material is resistant to the high temperatures to which it may be exposed during regeneration of the filtering means. The insulation of the housing, in addition to lessening heat dissipation within the plenum, serves to enhance the safety of the filter assembly by reducing the surface temperature of the housing.

Each of the filter arrangements utilizes materials that are highly resistent to excess temperature so that the exhaust filter may be regenerated by heat provided by any appropriate method. Further, the filters, while having a much higher efficiency than present ceramic and metal trap filter designs, provide effective filtration of soot expelled from the diesel engine with a minimal pressure drop across the filter. The filter arrangements preferably comprise a fiber filter sandwiched between woven wire mesh. The fiber filter preferably comprises quartz, borosilicate-E or aluminosilicate.

Further, the structure of the exhaust filter is such that it may be easily disassembled to facilitate service, even after the device has been installed on a vehicle. The housing includes a plenum and at least one removable endplate. Once the endplate has been disassembled from the plenum, the self-contained filter arrangement may be removed to permit replacement or further cleaning. The filter arrangement may then be reinserted and the housing easily reassembled.

The exhaust filter may also incorporate an electric heater in the plenum, which may be operated from an electric source in the vehicle. The electric heater may serve to heat the plenum in order to initiate the regeneration of the filter assembly.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 4 is a cross-sectional view of the filter system taken along line 4—4 in FIG. 1;

FIG. 5 is a cross-sectional view of an alternate embodiment of the filter system shown in FIG. 1;

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

DESCRIPTION OF THE PREFERRED EMBODIMENT

Figure 1:
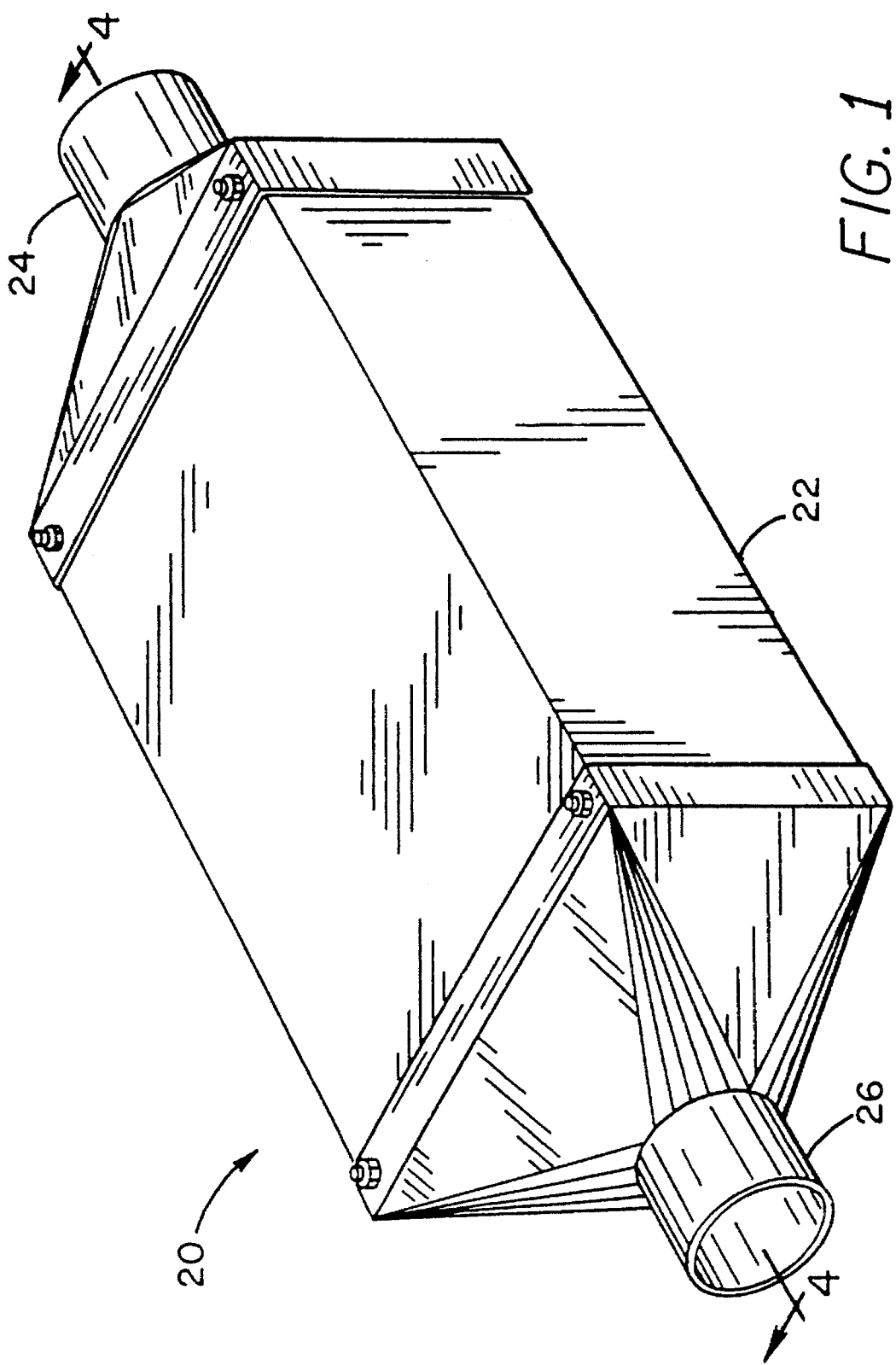
FIG. 1 is a perspective view of an exemplary filter system embodying the invention.

Turning now to the drawings, there is shown in FIG. 1 an exhaust filter system 20 for use in the exhaust system of a diesel powered vehicle. The filter system 20 includes a housing 22 having an inlet pipe 24 and an outlet pipe 26. The housing 22 may be connected in-line with the exhaust system of a diesel powered vehicle to provide a flow of exhaust gases from the engine into the inlet pipe 24, through the housing 22, and out of the outlet pipe 26 to the atmosphere. In a currently preferred embodiment, the inlet and outlet pipes 24, 26 are on the order of two inches, or fifty millimeters in diameter.

Figure 2:
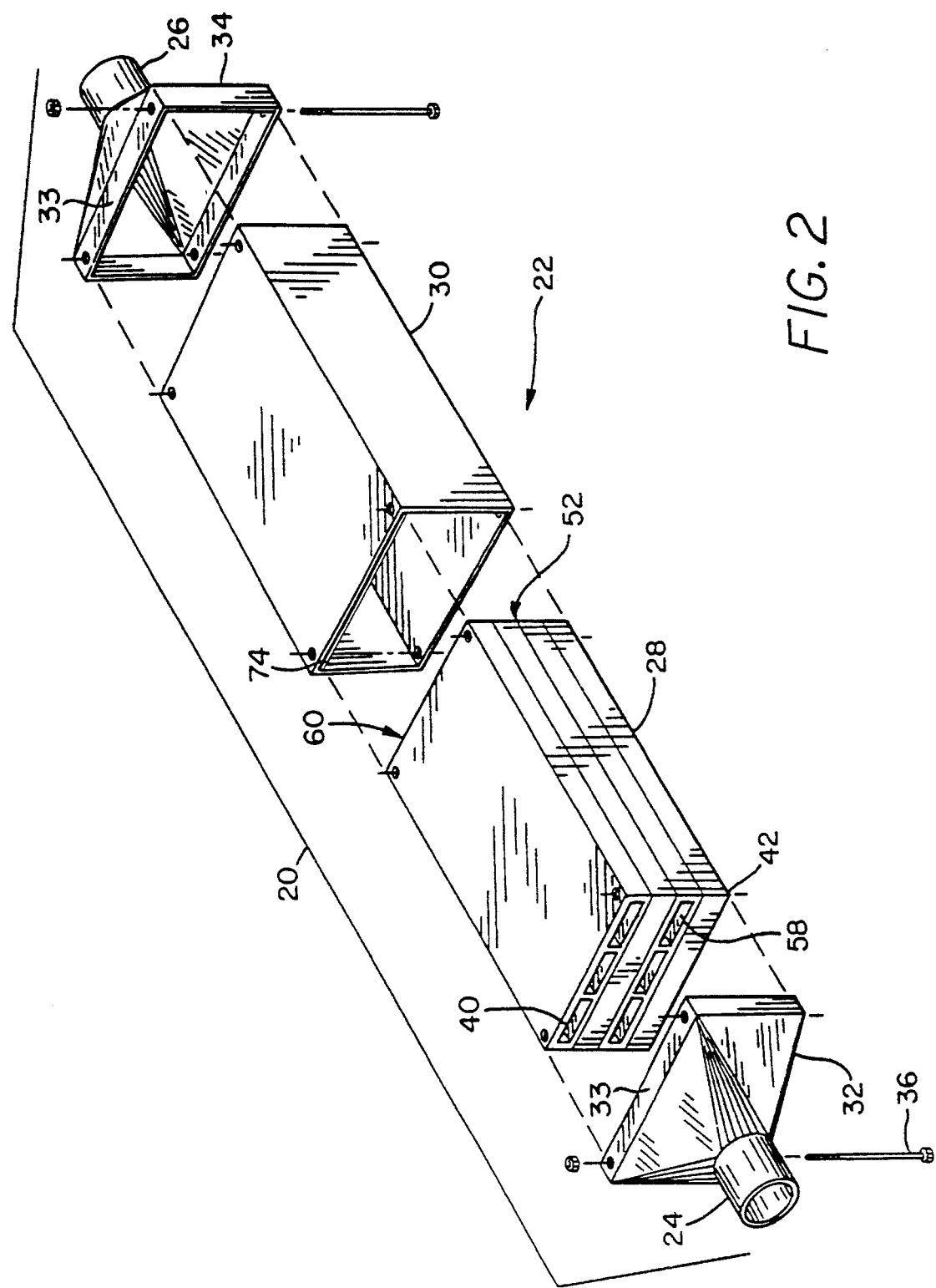
FIG. 2 is an exploded view of the filter system of FIG. 1.

In accordance with one aspect of the invention, there is provided a self-contained filter arrangement 28 in line with the gas flow through the housing 22, as shown in the exploded view in FIG. 2. The filter arrangement 28 provides high efficiency filtration of the gases passing therethrough, while providing a relatively low pressure drop across the filter system 20. Further, the filter arrangement 28, and, indeed, the filter system 20 is comprised of materials that are highly resistant to heat required for the regeneration process.

In the embodiment shown in FIGS. 1–4, the housing 22 comprises a plenum 30, which is generally configured as a rectangular parallelpiped. It will be appreciated, however, that the housing 22 as well as the self-contained filter arrangement 28, may be of a suitable alternate geometric design. In the preferred embodiment, the inlet pipe 24 and the outlet pipe 26 are formed integrally with the endplates 32, 34, respectively. The endplates 32, 34 are provided with flanges 33 for coupling the endplates 32, 34 to the plenum 30 by way of bolts 36 or other suitable fastening devices, which extend through the flanges 33 and the plenum 30. Accordingly, those skilled in the art will appreciate that the housing 22 may be easily disassembled for maintenance or replacement of the filter arrangement 28, even after installation. Although the housing 22 may be of any appropriate dimensions, a currently preferred design is on the order of eight inches by fifteen inches by six inches. However, for larger engines, or different vehicles, these dimensions may be effectively altered to different proportions to fit the space provided.

Figure 18:
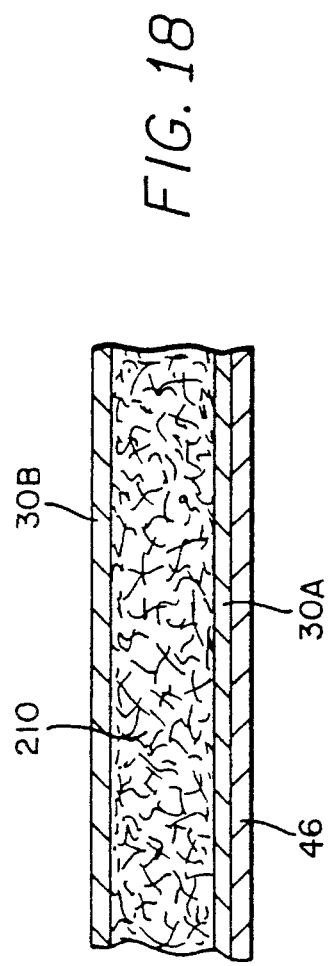
FIG. 18 is a cross-sectional view of a modification of a portion of the housing of the filter system of FIG. 16.

The housing 22 may be coupled to an insulating material, which is resistant to the high temperatures to which such material may be exposed during regeneration of the filtering arrangement 28. Typically, the plenum is wrapped with the insulating material and preferably all of the outer side of the housing is wrapped with the insulating material. In a preferred embodiment, the insulation may be sandwiched between inner and outer walls of the housing 22. FIG. 18 shows a cross-sectional view of a portion of the plenum 30 of this embodiment. The insulating material 210 is sandwiched between inner and outer walls 30A, 30B of the plenum 30. In an alternate embodiment, the insulating material may be a blanket wrapped around the interior or exterior of the housing 22. Suitable insulation material may comprise inorganic fibers capable of withstanding the temperatures produced during regeneration of the filtering means, e.g., calcium silicate fibers.

The presence of the layer of insulating material minimizes heat loss from the housing. This allows the high temperatures required to burn off soot collected in the filtering means to be achieved with a lower energy input. By preventing the dissipation of heat from the filter assembly, the insulation also increases the efficiency of the soot burn off once combustion of the soot has been initiated and enhances the safety of the filter assembly by reducing the surface temperature of the housing.

Further, in order to facilitate installation of the filtering system 20 on the vehicle, the housing 22 may be provided with mounting brackets (not shown). The mounting brackets may be formed integrally with one of the components of the housing 22, or may be formed as separate components, which may then be coupled to the housing 22.

Figure 3:
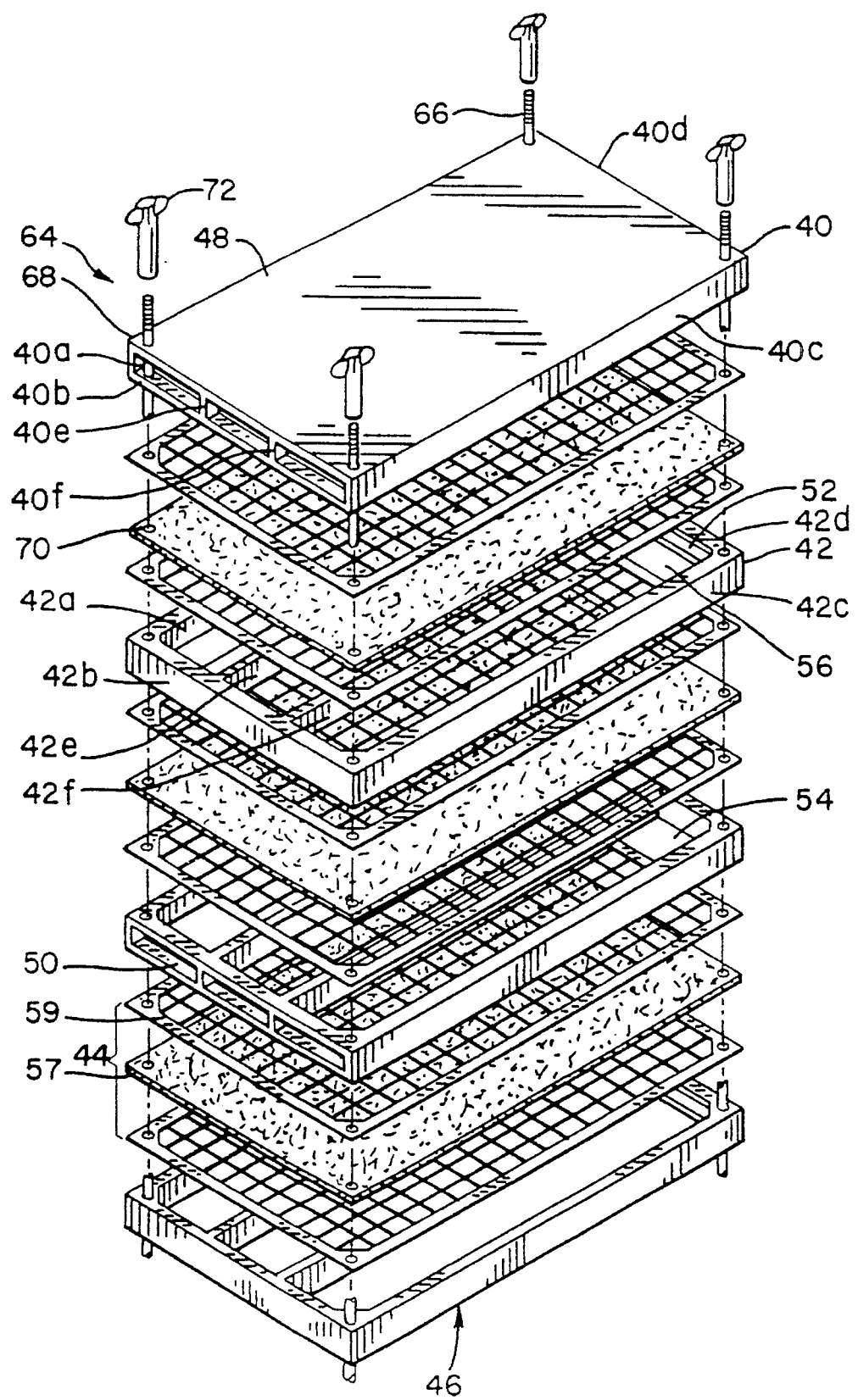
FIG. 3 is an exploded view of a portion of the filter arrangement of FIG. 2.

The self-contained filter arrangement 28 is shown in greater detail in FIG. 3. The filter arrangement 28 is configured as a rectangular parallelpiped and generally comprises an assembly of inlet cells 40, outlet cells 42, and filter elements 44 compressed between opposite impervious endplates 46, 48, which may be integrally formed with the inlet and outlet cells 40, 42, as shown in FIG. 3. The inlet and outlet cells 40, 42, which may be identical to each other, are relatively thin structures. The configuration of the self-contained filtering means provides access to both sides of the microporous filter elements, thereby increasing the soot load capacity and life of the filter assembly.

Each cell 40, 42 includes four frame members 40a–40d, 42a–42d joined in a rectangular frame and a number of support members. In the embodiment illustrated in FIG. 3, each cell 40, 42 includes two support members 40e–40f, 42e–42f connected between opposite frame members 40b, 40d, 42b, 42d. However, any number of support members arranged in any appropriate configuration or geometry may be utilized. Small cells may not require support members.

For both the inlet and outlet cells 40, 42, one of the opposite frame members 40a, 42a contains several apertures 50, 52, which interconnect the exterior of the cell 40, 42 and the interior spaces 54, 56 between the frame and support members 40a–40f, 42a–42f. In the embodiment shown in FIGS. 2–4, the apertures 50, 52 are of a rectangular shape. The rectangular shape provides highly efficient air flow through the cells 40, 42. It will be appreciated, however, that the apertures 50, 52 may be of any appropriate shape.

Likewise, the cells 40, 42 may be fabricated by any appropriate method; for example, the cells 40, 42 may be milled, machined, or cast. According to one low cost method, the cells 40, 42 may be flame cut or machined from flat sheet metal. The apertures may then be drilled in one of the frame members. Another low cost method is to cast the cells in steel or iron.

The inlet and outlet cells 40, 42 are distributed alternately within the filter arrangement 28 with the frame and support members 40a–f of the inlet cells 40 lying opposite the frame and support members 42a–42f of the outlet cells 42, respectively. The inlet and outlet cells 40, 42 are further arranged so all of the inlet apertures 50 and none of the outlet apertures 52 open onto one surface of the filter arrangement 28, defining an inlet surface 58 facing the endplate 32, as shown in FIG. 2. In the exemplary filter system 20, all of the outlet apertures 52 open onto the opposite surface of the filter arrangement 28, defining an outlet surface 60 facing 180 degrees from the inlet surface 58. Alternately, the outlet apertures 52 may open onto a side surface or surfaces of the filter arrangement 28, or any appropriate combination thereof, so long as the inlet apertures 50 are sealed from the outlet apertures 52.

Returning now to FIG. 3, disposed between the inlet and outlet cells 40, 42, the filter elements 44 each comprise one or more layers of a microporous filter 57 for removing particulate contaminants, e.g., carbon and hydrocarbon particles. The filters 57 are exposed to excessive temperatures, as well as hydrocarbons, chlorides, and acid forming exhaust. Consequently, the filter material must be highly resistant to high temperatures and chemical deterioration. A variety of microporous filter materials or combinations thereof are suitable for use in the filter element 44, including ceramic fibers, porous metal fiber, or porous metal powder. Such materials as high purity silica, aluminosilicate or borosilicate-E glass, powdered metal alloys, boron, and carbon fibers, as well as other synthetic fibrous or matrix-forming materials may likewise be used. In general, any inorganic fibrous material that has a service temperature of at least 1200° F. may be used if the material is capable of forming a filter media that will permit the efficient removal of solid contaminants, such as soot particles, at a low pressure drop. It will be appreciated, however, that the filter medium utilized preferably provides a high efficiency filter and is able to withstand repeated heating to high temperatures. Typically, the filter elements of the present invention comprise fibers having an average fiber diameter of from about 0.25 micron to about 15 microns and preferably of from about 0.5 micron to about 2.0 microns. Additionally, the filter element is preferably fashioned as a compressible material to allow the filter elements to be sealingly compressed when pressure is applied to the inlet and outlet cells.

A preferred filter 57 comprises quartz fiber, which is able to withstand extremely high temperatures, and has a high efficiency. Quartz fibers, such as Manville Corning type 104, 106, 108, 110 grades, or blends thereof, may be used. This filter is advantageous in that it blends fibers from under one-half micron in diameter to four microns into a highly porous sheet with low air resistance, while retaining integrity without the addition of binders. Further, these quartz fibers have melting points over 2500° F., and a wide range of chemical resistance.

Borosilicate-E glass fibers, aluminosilicate fibers or chromium-containing aluminosilicate fibers are also preferred as materials which may be used in the filter elements of the present invention. These materials are commercially available in blends of very fine fibers. For instance, borosilicate-E glass fibers are commercially available in a variety of average fiber diameters, such as 104, 106 and 108B grade fibers, available from Johns-Manville Corporation. The filter elements 57 may preferably include a blend of borosilicate-E glass fibers having an average fiber diameter of 0.65 microns and a surface area of 2.3 $m^2/g$. Borosilicate-E glass fibers have a service temperature of 1200° F., a softening point of over 1500° F., and excellent chemical resistance. Aluminosilicate fibers and chromium-containing aluminosilicate fibers, such as are available from Johns-Manville Corporation with an average fiber diameter of 3-4 microns, may also be used in the filter elements of the present invention. Aluminosilicate fibers and chromium-containing aluminosilicate fibers have melting points above 3200° F., and a wide range of chemical resistance.

It will likewise be appreciated that alternate filter arrangements may be utilized. One or more grades of filters may be utilized to act as a prefilter. For example, the filter arrangement may include a multi-layered structure, where the first layer to be contacted by the exhaust gas flow has a larger pore size than the adjacent downstream layer. This arrangement provides efficient removal of soot particles at a low pressure drop while making the filter element less susceptible to clogging. Such arrangements may serve to extend the life of the filters.

Further, support elements 59 may be provided adjacent the microporous filters 44 in order to provide additional support thereto. In general, any metal mesh, which is capable of providing support to the areas of the filter elements unsupported by the frame members of the inlet and outlet cells, may be used. Preferably, the support elements are able to withstand the temperatures produced during the regeneration of the filter elements and typically have a service temperature of at least 1200° F. In some applications, where the filter assembly is subjected to higher temperatures during use, a service temperature of at least 1500° F. is preferred. Currently, preferred embodiments of the invention utilize a woven metal wire mesh, sintered metal fibers, or a sintered, woven metal mesh, such as RIGIMESH, a product available from Pall Corporation. Other support materials may also be suitable as support elements 59, so long as such materials are able to withstand extremely high temperatures and do not result in rapid development of excessive back pressure. The woven wire mesh is typically formed of a metal such as a carbon steel or low-alloy steel. Woven wire mesh formed from stainless steel (e.g., 304, 316 or 347 stainless steel) or higher alloys may also be used, particularly where enhanced corrosion resistance is desired. Mesh sizes such as 100 mesh, 90×100 mesh or 70 mesh are typically used. These mesh sizes have a very fine wire size and a pore size that is small enough to retain the fibers of the filter element but large enough to avoid creating a large pressure drop across the filter element. A porous metal media, such as PMM media, available from Pall Corporation, may likewise be suitable.

The impervious endplates 46, 48 are preferably fashioned from sheet metal to provide additional structural integrity. Each endplate 46, 48 is located adjacent an inlet or outlet cell, 40, 42, preferably with a gasket or other supplemental sealant disposed between them.

To compress the filter elements 44 between the inlet and outlet cells 40, 42 and to provide structural integrity to the self-contained filter arrangement 28, the endplates 46, 48 are disposed on opposite ends of an interconnecting frame assembly 64. While a variety of interconnecting frame assemblies 64 may be suitable, including a spring biased clamping assembly, in the exemplary exhaust filter system 20, the interconnecting frame assembly 64 comprises tie rods or carriage bolts 66 running through holes 68 in the corners of the cells 40, 42 and endplates 46, 48 and through cut-outs (not shown) or holes 70 in the corners of the filter elements 44. Wing nuts 72 are threaded onto the threaded ends of the carriage bolts 66 and may be tightened to provide the desired compression.

Gaskets may be provided between the filter elements 44, the support screens 59, and the inlet and outlet cells 40, 42 to eliminate or minimize leakage. However, the fine fiber materials of the filter elements 44 and openings in the mesh support screen 59 may seal together in a manner that prevents leakage, thus eliminating the need for gasket materials in these locations.

A gasket 74 is disposed between the plenum 30 and the filter arrangement 28 to prevent leakage of the air from between them. The gasket 74 also dampens vibrations and noise. The gasket may be formed of any suitable high temperature material, including quartz sheets, magnesium fiber, or other mineral compositions. Alternately, the gasket 74 may be a commercial high temperature metallic-type gasket, such as, for example, the type available from Flexetallic Company. Likewise, the gasket may be constructed of any appropriate cross-section. For example, metal gaskets may be constructed of a ">" cross-section, wherein the deflection of the open end will create a self-adjusting seal between the two surfaces. Such an "elastic" metal seal would also accommodate variations of manufacturing tolerances of the components.

As shown in FIG. 4, from the inlet apertures 50, the exhaust flows generally parallel to the adjacent filter elements 44 into the interior spaces 54 of the inlet cells 40. It then changes direction and passes through either of the adjacent filter elements 44 where particulate contaminants are removed. After passing through the filter elements 44, the purified air flows into the interior spaces 56 of the outlet cells 42 and again changes direction, flowing generally parallel to the adjacent filter elements 44 through the outlet apertures 52.

The air is evenly distributed along the filter elements 44 as it flows generally parallel to the filter elements 44. The air then flows substantially perpendicularly through the filter elements 44. In this way, particulates are substantially evenly distributed along the filter elements 44.

The filter arrangement 28 may include a large number of filter elements 44, and, therefore, present a large filtering area, in a relatively small space. Further, as the adjacent frame members and filter elements 44 provide sufficiently large contact area, leakage of air between the frame members and the filter elements 44 is prevented when the assembly of cells 40, 42 and filter elements 44 is compressed by tightening the wing nuts onto the carriage bolts 66. Thus no gaskets or supplemental sealants are required between the filter elements 44 and the inlet or outlet cells 40, 42.

It will be appreciated by those in the art that the self-contained filter arrangement 28 is easy to service. With either of the endplates 32 or 34 removed, as explained above, the self-contained filter arrangement 28 may be easily removed from the plenum 30. One or more of the filter elements 44 may be removed and cleaned or replaced simply by loosening the wing nuts 72 on the carriage bolts 66. The flexible filter elements 44 may be removed from the filter arrangement 28 by simply loosening the wing nuts 72, rather than completely removing them, inasmuch as the corners of the filter elements 44 have cutouts (not shown), rather than holes 70. Once the filter elements 44 have been reinserted in the filter arrangement 28, the wing nuts 72 are than tightened onto the carriage bolts 66 until the filter elements 44 are again adequately compressed against the inlet and outlet cells 40, 42.

Figure 19:
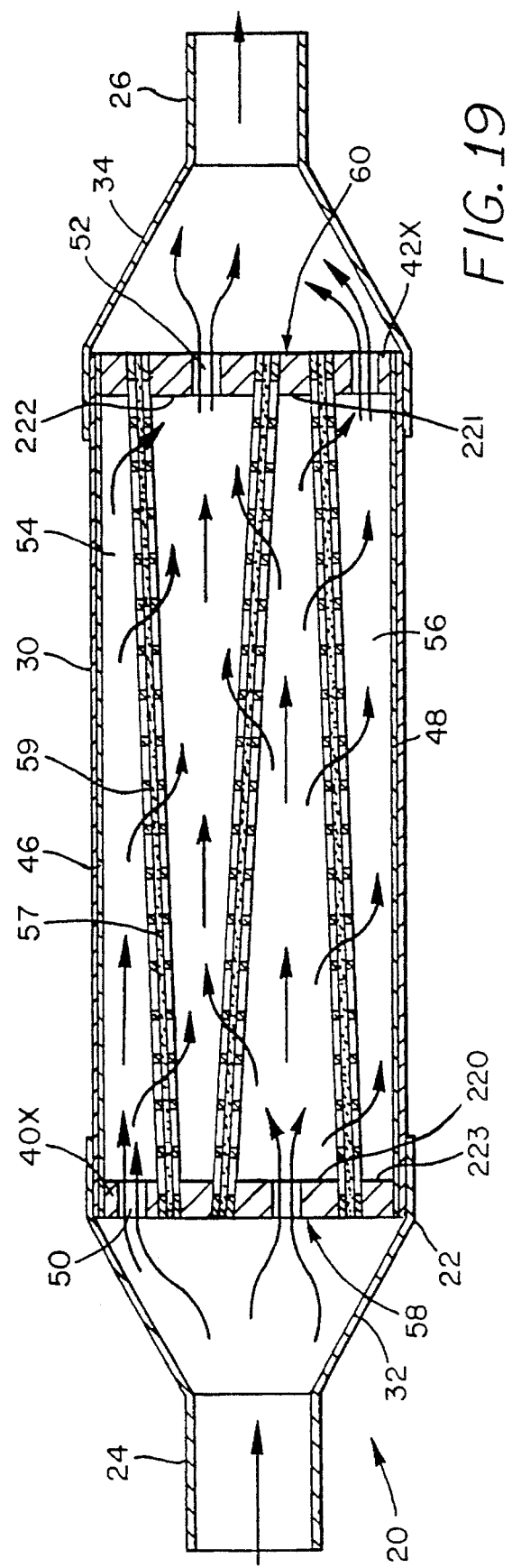
FIG. 19 is a cross-sectional view of an alternate embodiment of the filter system of the present invention.

FIG. 19 shows an alternative embodiment of the present invention which is configured substantially as in the first embodiment of the present invention and those elements corresponding to elements in the first embodiment of the present invention retain the reference numerals. In contrast to the first embodiment, in which the configuration of the filter elements is substantially parallel (see e.g., FIG. 4), the embodiment shown in FIG. 19 includes "wedge-shaped" inlet and outlet cells 40x, 42x. The inlet cells 40x have inlet end frame members 220 that are thicker than the blind outlet end frame members 221. Similarly, the outlet cells 42x have outlet end frame members 222 that are thicker than the blind inlet end frame members 223. The side frame members (not shown) of the inlet and outlet cells are tapered accordingly. For a given number of filter elements, this configuration permits the construction of a filter assembly having smaller external dimensions than would be possible with an assembly having the parallel filter element configuration.

Figure 16:
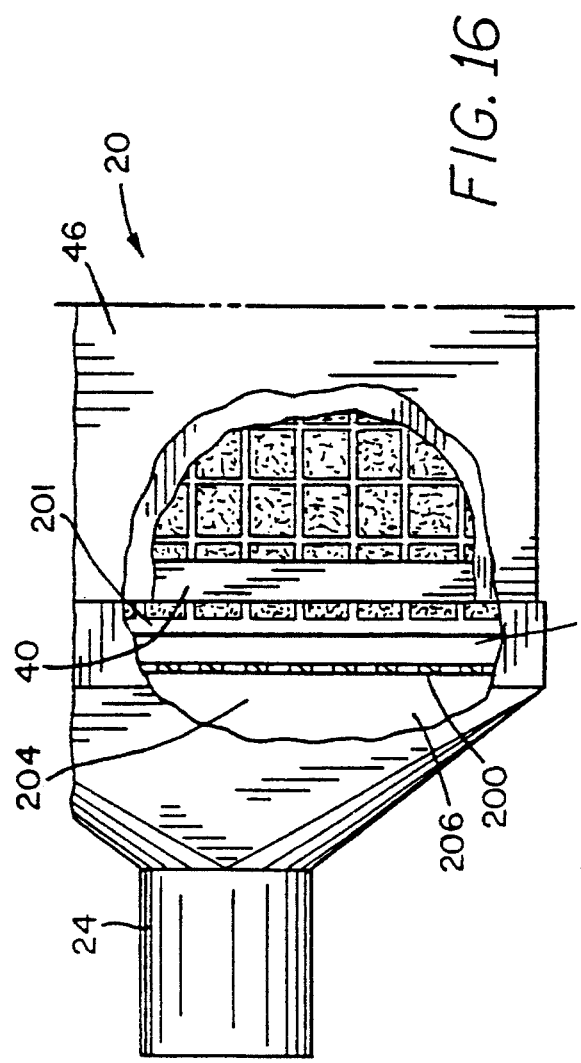
FIG. 16 is a partially cutaway top view of the inlet end of an alternate embodiment of the filter system of the present invention.
Figure 17:
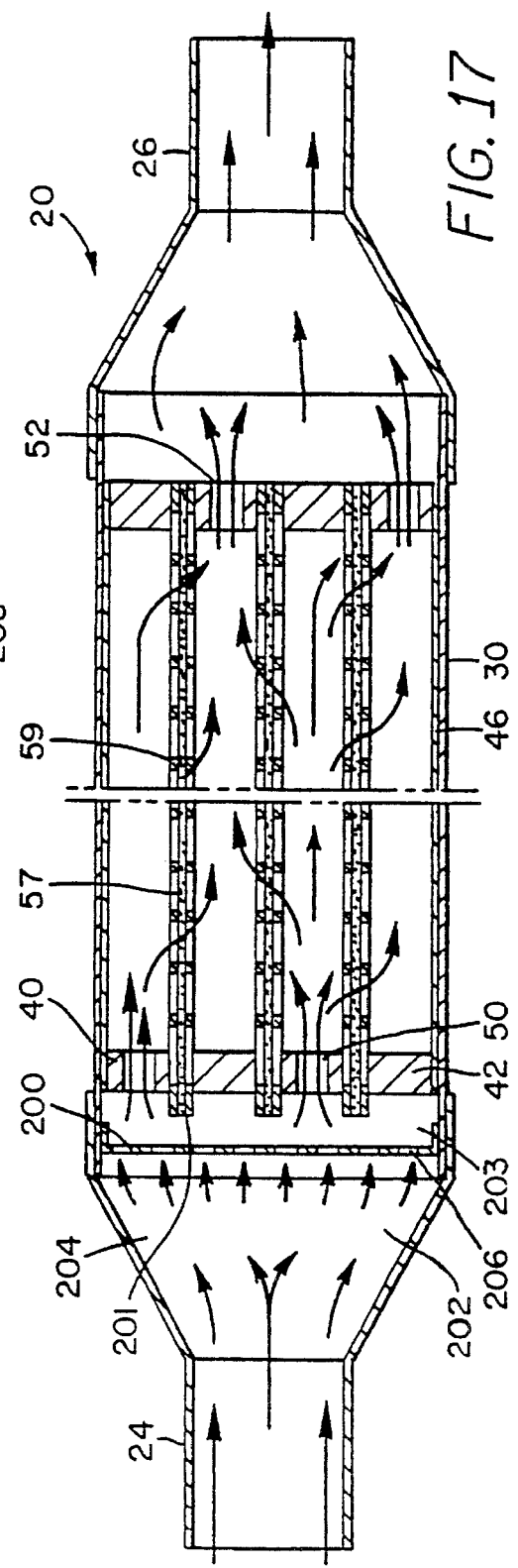
FIG. 17 is a cross-sectional view of the filter system of FIG. 16.

Another embodiment of the invention is shown in FIGS. 16 and 17. The filter assembly of this embodiment is configured substantially as in the first embodiment of the present invention and those elements corresponding to elements in the first embodiment of the present invention retain the reference numerals. As shown in FIGS. 16 and 17, the housing 22 includes a diffuser baffle 200. The inlet chamber 204 may be partitioned by a diffuser baffle 200 into an outer inlet chamber 202 communicating with the inlet pipe, and an inner inlet chamber 203 communicating with the inlet cells. The baffle 200 has perforations 206 therethrough and comprises materials that are resistant to the high temperatures that may be produced during regeneration of the filtering arrangement. Preferably, the total area of the perforations 206 is no less than about 25% and preferably about one-half the total surface area of the baffle 200. In a typical embodiment of the invention, the baffle 200 has ¼ inch diameter perforations 206, the total area of which is about 50% of the total surface area of the baffle 200. The baffle 200 serves to better distribute incoming gases in the inlet chamber 204 without significantly increasing back pressure in the exhaust system. This allows higher incoming exhaust gas velocities to be accommodated and enhances the efficiency of the filter system.

The filter arrangement 28, a portion of the filter element 57 extends past the inlet and outlet cells 40, 42. In one embodiment, the filter arrangement includes a filter support element 59 disposed along each side of each filter element 57. In a preferred embodiment, the filter element 57 is disposed between two adjacent support elements 59, which may be fastened together, e.g., with staples, along the inlet edge to prevent damage to the filter element 57. Preferably, portions of the filter element 57 and the filter support element 59 disposed adjacent the microporous filter element 57, extend past the inlet and outlet cells 40, 42 into the inlet chamber 204 to form an initiator section 201. The initiator section 201 extends a sufficient distance beyond the inlet and outlet cells 40, 42, typically, about ½ inch to 1 inch, to permit the initiator section 201 to be heated by entering exhaust gas without a substantial dissipation of heat, thereby, to facilitate combustion of the solid contaminants. The inlet cells 40, the outlet cells 42, the microporous filter elements 57, and the filter support elements 59 comprise materials that are resistant to high temperatures such that the filtering arrangement may be regenerated by heat.

During operation, exhaust gas flows from the inlet port into inlet chamber 204, past initiator sections 201, into the inlet cells 40, through the filter elements 57 and filter support elements 59 and out through the outlet cells 42. Solid contaminants, such as soot particles, are collected on the initiator sections 201 as well as on the portions of the filter elements 57 between the inlet and outlet cells 40, 42. The initiator sections 201, which extend into the inlet chamber 204 contact hot incoming gases before heat can be dissipated through the inlet and outlet cells 40, 42. This allows the initiator sections 201 to be heated more rapidly and to a higher temperature than the remaining portions of the filter elements and support elements during the regeneration phase of a filter cycle. The initiator sections facilitate the ignition of soot particles during the initial stage of the regeneration phase and as a result, the efficiency of combustion of trapped soot particles is enhanced.

An alternate embodiment of the invention is shown in FIG. 5. In this embodiment, the housing 22A comprises a generally cylindrical shaped plenum 30A to which the inlet endplate 32A is secured by bolts 36A along an outwardly extending flange 80. The self-contained filter arrangement 28A is likewise of a generally cylindrical shape. In order to retain the filter arrangement 28A in an appropriate position within the housing 22A, post spacers 84 are provided along the inlet side of the housing 22A. It will be appreciated that the incoming exhaust flows into the housing 22A through the inlet pipe 24A, past the post spacers 84, and through the filter arrangement 28A, and out of the outlet pipe 26A.

The cylindrical filter arrangement 28A is preferably of pleated design, sandwiching a filter medium between alloy mesh supports. Preferably, the filter medium may include Tissuquartz™, sandwiched between stainless steel 40–60 mesh, of the types available from Pall Corporation. Other preferred filter media comprise quartz fibers, borosilicate-E fibers, aluminosilicate fibers or chromium-containing aluminosilicate fibers.

Figure 6:
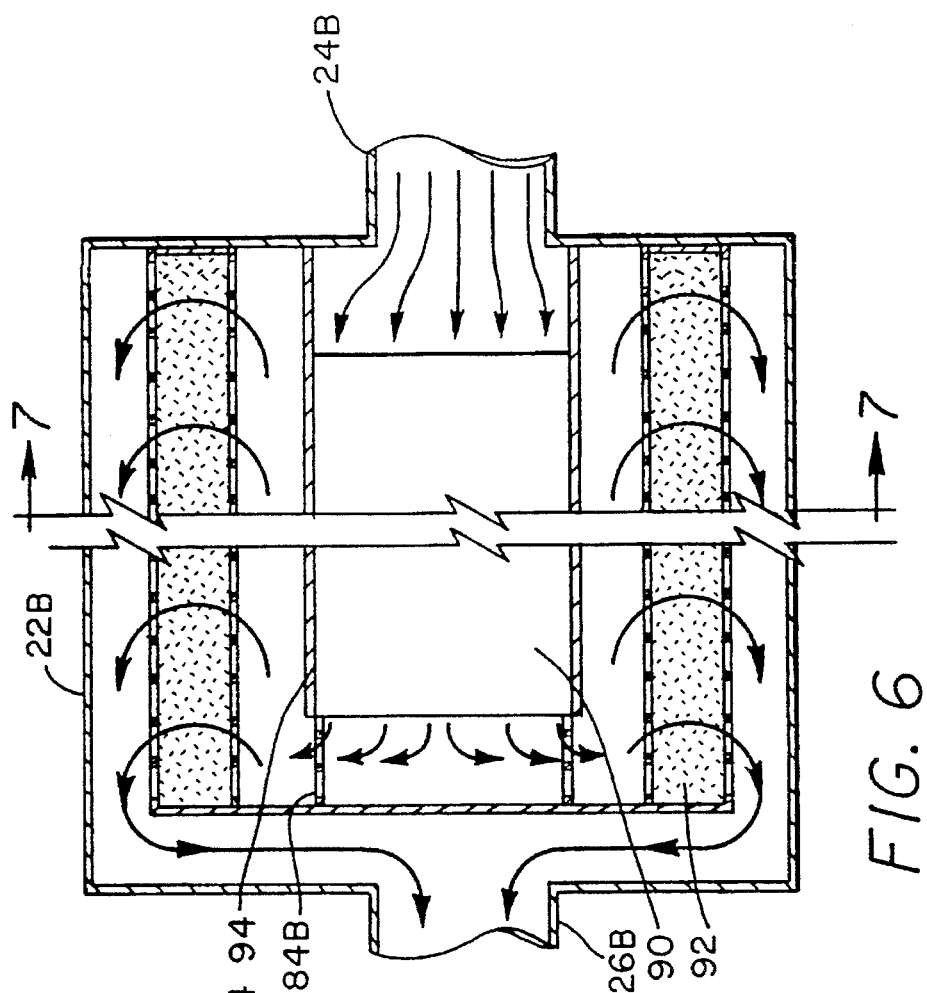
FIG. 6 is a cross-sectional view of an alternate embodiment of the filter system shown in FIG. 1.
Figure 7:
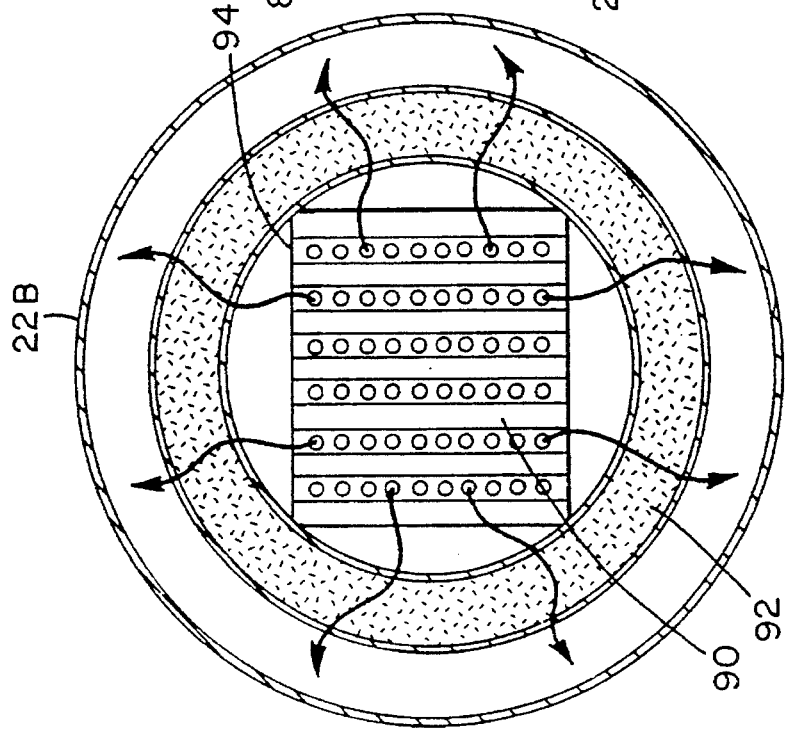
FIG. 7 is a cross-sectional view of the filter system taken along line 7—7 in FIG. 6.

Another embodiment of the invention, which is shown in FIGS. 6 and 7, provides a combination of a flat filter 90, as in the first embodiment, and a cylindrical filter 92, as with the second embodiment in a single exhaust filter system. The flat filter 90 may be supported on a flat frame 94 within the housing, while the cylindrical filter 92 may be held in position by the post spacers 84B. It will thus be appreciated, that air enters the housing 22B through the inlet pipe 24B, passes through the flat filter 90 and the cylindrical filter 92, and passes out of the housing 22B through the outlet pipe 26B to the atmosphere. As with the embodiments above, the housing 22B may include endplates that may be secured to the plenum by any appropriate method.

Figure 8:
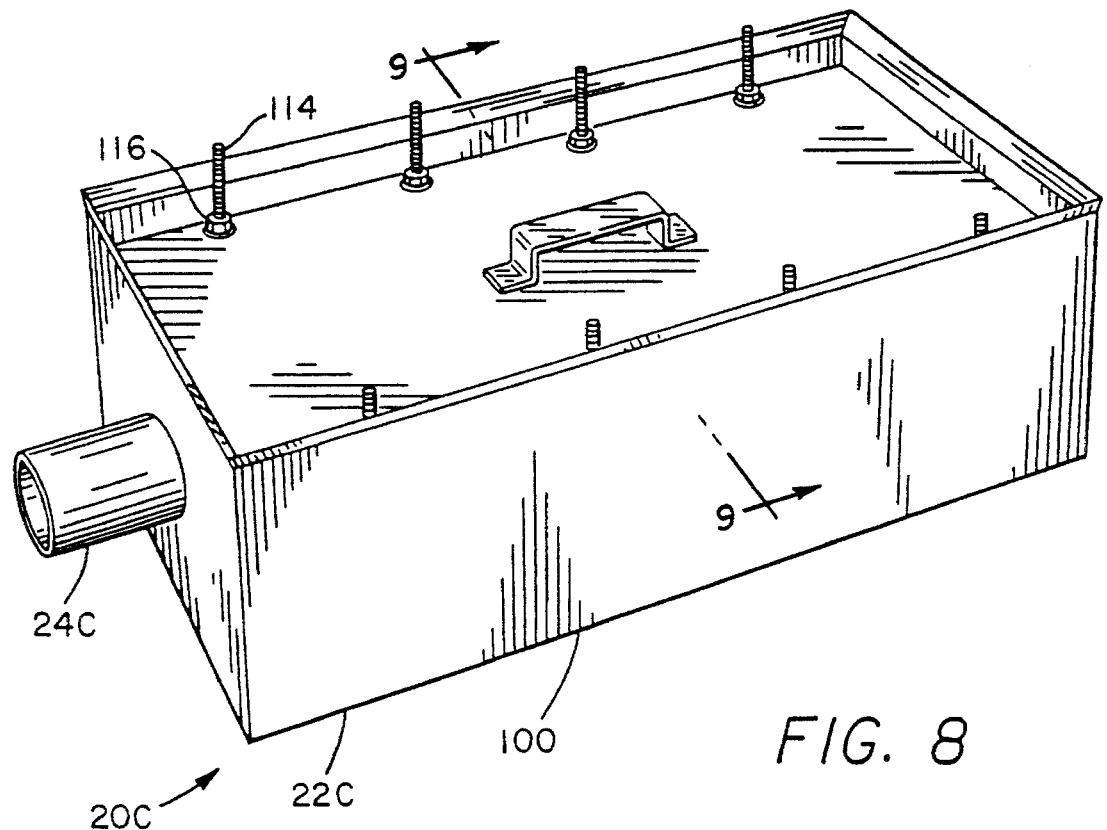
FIG. 8 is a view of an alternate embodiment of the embodiment of the filter system shown in FIG. 1.

Another embodiment of the invention is shown in FIGS. 8–11. As shown in FIG. 8, the filter system 20C includes a housing 22C having an inlet pipe 24C and an outlet pipe (not shown). As shown more clearly in FIG. 9, the housing 22C comprises a plenum 100 having a rectangular box shape with an open top. The housing 22C further comprises a topplate 102 having a flat surface 104 and upwardly and outwardly extending sides 106. The lower surface 108 of the plenum 100 and the topplate 102 are provided with corresponding holes 110, 112 through which tie rods or carriage bolts 114 may be inserted. Nuts 116 may then be tightened onto the bolts 114 to tighten the topplate 102 onto the plenum 100 and secure the components together. Those skilled in the art will appreciate that as the topplate 102 is pressed downward within the open top of the plenum 100, the upwardly and outwardly extending sides 106 of the topplate 102 will form a seal between the plenum 100 and the topplate 102.

Figure 10:
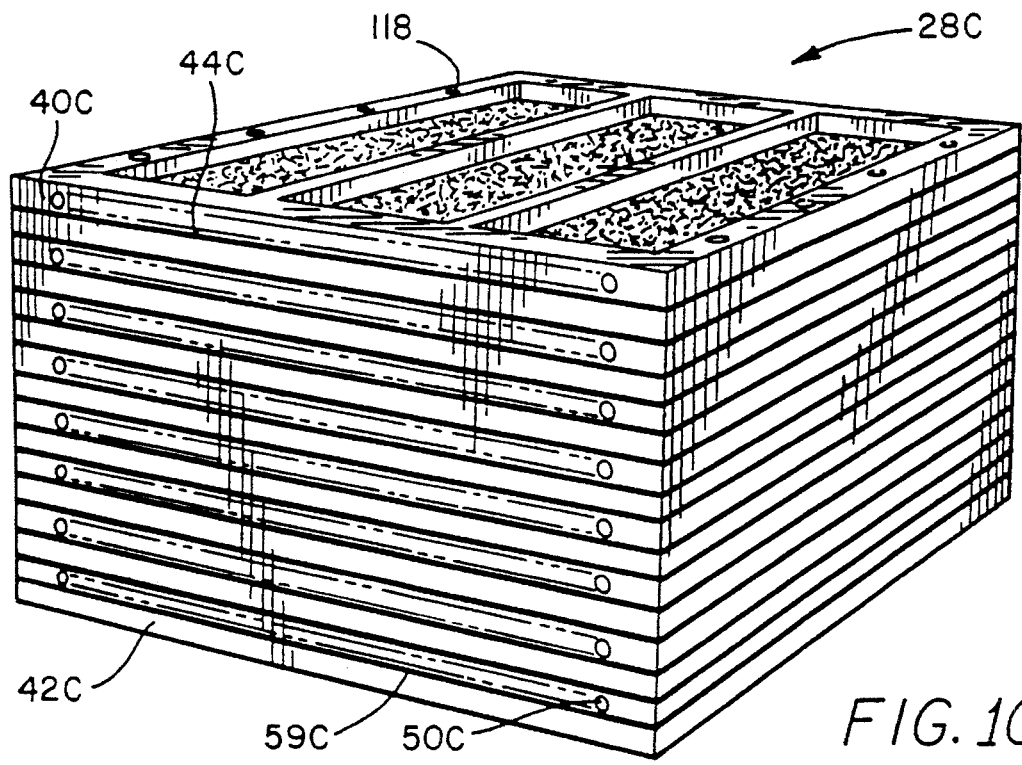
FIG. 10 is a perspective view of the filter arrangement of FIG. 9.
Figure 11:
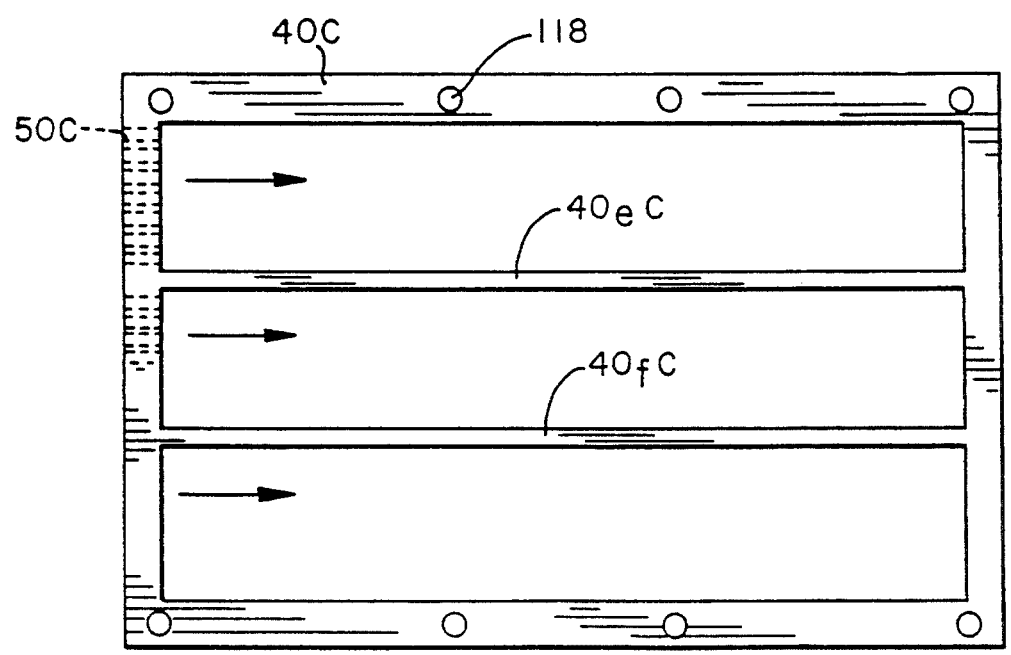
FIG. 11 is a top view of an inlet cell of FIG. 10.

Disposed within the plenum 100 is a self-contained filter arrangement 28C, which is shown in more detail in FIG. 10. The filter arrangement 28C comprises an arrangement of inlet and outlet cells 40C, 42C, filter elements 44C, and support screens 59C, similar to those shown in FIGS. 2–4. To compress the components of the filter arrangement, the components are provided with a plurality of openings 118, similar to the holes 68 and holes 70 in the embodiment shown in FIGS. 2–4.

Figure 9:
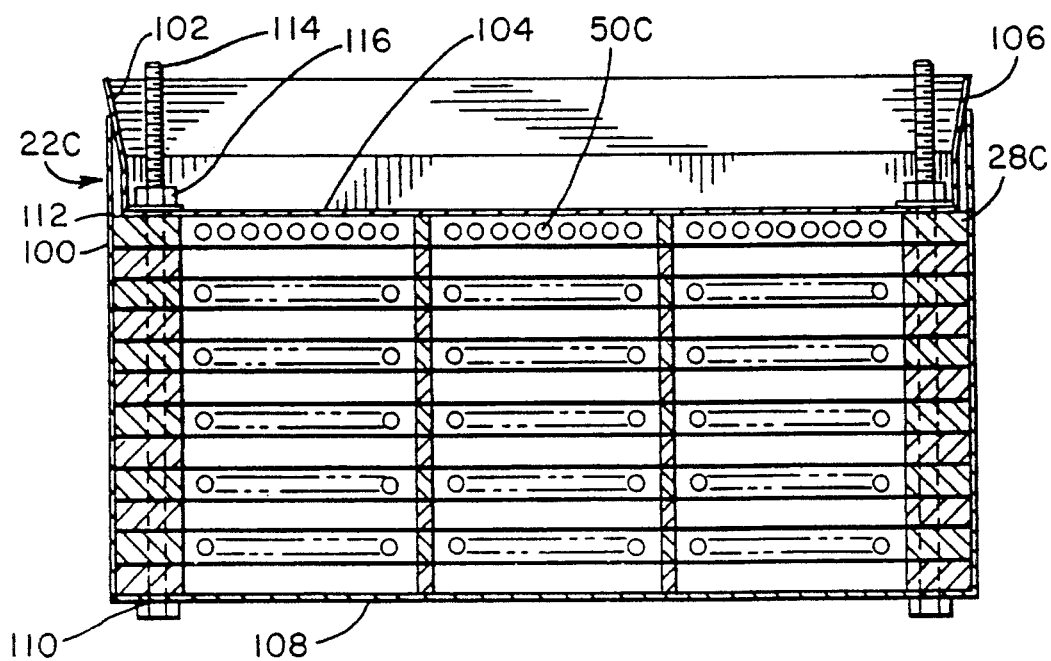
FIG. 9 is a cross-sectional view of the filter system taken along line 9—9 in FIG. 8.

As shown in FIG. 9, the assembly bolts 114 may be inserted through the openings 110 in the lower surface 108 of the plenum 100, the openings 118 of the filter arrangement 28C, and the openings 112 in the topplate 102 and the nuts 116 tightened down to assemble the filter system 20C. In this embodiment, the system 20C may be assembled without the use of gaskets, as the filter arrangement 28C seats directly against the lower surface of the plenum 100 and the topplate 102, and tightening the assembly bolts 114 and nuts 116 compresses the assembly, including the filter elements 44C, cells 40C, 42C, and support screens 59C. This type of arrangement provides easier maintenance and extends the life of the system 20C.

Alternate methods of sealing the arrangement may be utilized that do not necessarily provide for easy field maintenance. For example, a method of sealing porous metal support screens and sintered filters is by swaging the edges with a forming press and dies. Alternately, metal edges may be sealed by welding.

Returning now to the filter arrangement 28C shown in FIGS. 9–10, it may be seen that the inlet apertures 50C and outlet apertures (not shown) are round. The inlet and outlet cells 40C, 42C may be more easily understood with reference to FIG. 11, which shows an inlet cell 40C. It will be appreciated, however, that the outlet cell 42C may be of a similar construction. During operation, gas enters the cell 40C through the apertures 50C and flows parallel to the support members 40eC–40fC, passes through the support screens 59C and the filter element 44C, and enters the outlet cell 42C to be passed out of the filter arrangement 28C.

Figure 12:
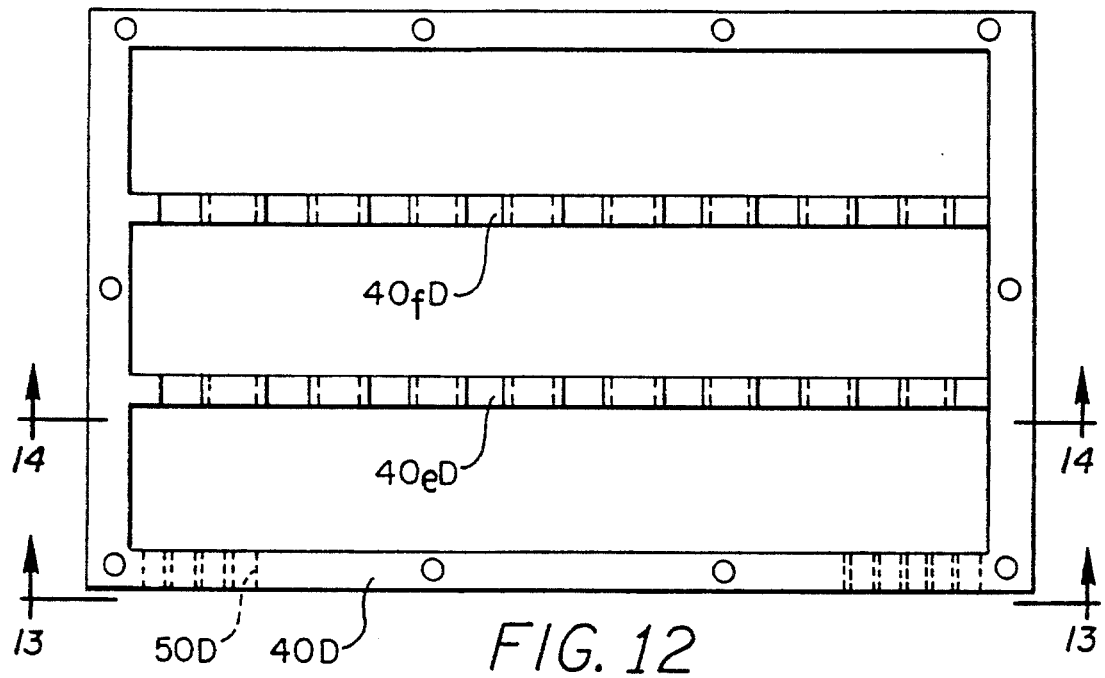
FIG. 12 is a top view of an alternate embodiment of inlet cell.
Figure 13:
FIG. 13 is a side view of the inlet cell taken along line 13—13 of FIG. 12.
Figure 14:
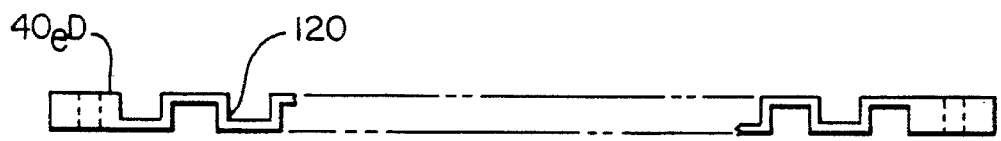
FIG. 14 is a side view of the inlet cell taken along line 14—14 of FIG. 12.

An alternate inlet/outlet cell 40D arrangement is shown in FIGS. 12–14. In this arrangement, gas enters the cell 40D through apertures 50D. As illustrated in FIG. 13, the apertures are round; the apertures, however, may be of an alternate configuration. It will be appreciated that in this configuration, rather than flowing parallel, the gas flows through the cell 40D substantially perpendicularly to the support members 40eD–40fD.

Therefore, in order to provide a smooth flow of gas through the cell 40D, the support members 40eD–40fD are of a configuration that permits the gas to flow perpendicularly past the support member. Although alternate designs may be appropriate, the "alternating step" design shown in FIG. 14 is particularly suitable for permitting gas flow past the support member 40eD–40fD by way of openings 120.

Thus, during operation, gas flows into the cell 40D through the apertures 50D. The gas may then flow directly through the adjacent support screens and filter element (not shown), or, may pass one or more support members 40eD–40fD by way of openings 120 and then flow through the adjacent support screens and filter element. It will be appreciated that if the gas flows past only one support member 40eD of the inlet cell 40D or flows directly through the adjacent support screens and filter element, the gas must pass similar one or more similar support members of the outlet cell before flowing out of the apertures of the outlet cell (not shown).

Figure 15:
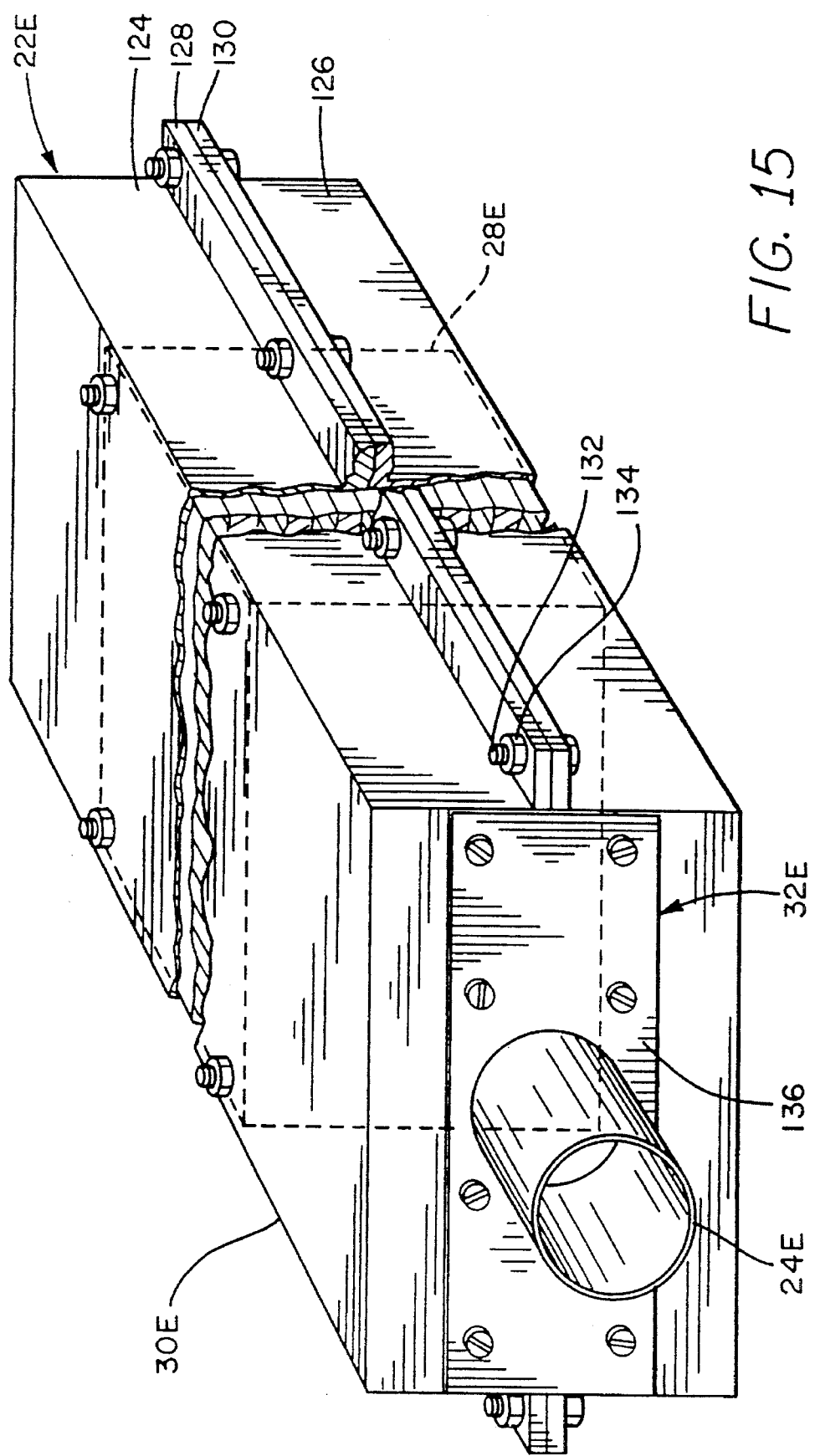
FIG. 15 is a perspective view of an alternate embodiment of the invention of FIG. 1.

Another embodiment of the invention is shown in FIG. 15. In this embodiment, the housing 22E comprises a substantially rectangularly shaped plenum 30E that is formed in two mating sections 124, 126 with outwardly extending flanges 128, 130. In order to secure the sections 124, 126 together, nuts 132 and bolts 134 are tightened together through openings in the flanges 128, 130. The housing 22E further comprises endplates 32E (the outlet endplate is substantially identical to the inlet endplate), which include a flat plate 136 from which extends an inlet pipe 24E or outlet pipe (not shown) for coupling to the exhaust system. The flat plate 136 is coupled to the plenum 30E by any appropriate method to provide a seal of the mating surfaces of the sections 124, 126. In the embodiment shown, the flat plate 136 is bolted to the plenum 30E. The filter arrangement 28E may be of any of the designs discussed above.

A test, which was conducted to determine the ability of a specific embodiment of the present invention to efficiently remove solid contaminants from diesel exhaust, is described in the example set forth below. This example is offered by way of illustration and not by way of limitation.

EXAMPLE 1

Efficiency of Diesel Exhaust Solid Contaminant Removal

A test was carried out to determine the ability of a filter assembly of the present invention to remove solid contaminants from the exhaust gases of a diesel engine. The filter assembly was fitted on the exhaust discharge of a Lombardini 6LD 435/B1 monocylindrical, direct injection, 4 phase, air cooled type diesel engine. The engine, which is representative of the "Light Duty" class of diesel engines, was run at two air/fuel ranges on a stationary bench. The filter assembly was configured substantially as shown in FIGS. 1–4 and included microfibrous filter elements disposed between two woven wire mesh support elements. The filter elements were formed from borosilicate-E glass fibers having a mean fiber diameter of 0.65 micron and a surface area of 2.3 $m^2$/g. The support elements were made of a 90× 100 woven wire mesh of 304 stainless steel. The filter arrangement contains 35 filter elements, each of which have an exposed area of about 1.4 square feet (note that both sides of each filter element is exposed).

During the test, engine discharge temperatures, hydrocarbon and $NO_x$ gas emissions, solid contaminant output and the pressure difference between the inlet and outlet of the filter assembly were measured. The engine was run for a period of about 150 minutes, during which the filter assembly demonstrated close to 100% solid contaminant removal. This highly efficient removal of solid contaminants was achieved while maintaining a pressure drop of less than 150 mm ($H_2O$) across the filter assembly. During the test, the filter had no influence on hydrocarbon or $NO_x$ emissions and did not affect the performance of the engine, both in terms of specific consumption and torque. The examination of the ability of this filter to be regenerated has not been completed.

In summary, the invention provides an improved exhaust filter system for a diesel engine. Each of the embodiments set forth utilizes materials that are highly resistant to heat. Consequently, the exhaust filter is regenerable. Further, the particular materials utilized maximize the efficiency of the filter while minimizing the resultant pressure drop across the filter, and, therefore, minimizes the effect of the filter on engine performance. The filter is of an uncomplicated design that may be easily assembled and disassembled in the field so that the filter system may be easily serviced.

I claim:

1. An exhaust gas filter assembly for removing particulates from the exhaust gas of an engine, comprising, in combination, a housing having an inlet pipe coupled to receive the exhaust gas from the engine and an outlet pipe coupled to vent exhaust gas to the atmosphere and defining an exhaust gas flow path through the housing and a filter arrangement disposed in the housing within the gas flow path, said filter arrangement including a plurality of inlet cells having first and second generally planar faces, a plurality of generally planar microporous filter elements, a plurality of outlet cells having first and second generally planar faces, said outlet cells being alternately arranged with at least one microporous filter element disposed between the second face of each inlet cell and adjacent the first face of a corresponding outlet cell, and wherein the inlet and outlet cells, and the microporous filter elements comprise materials that are resistant to high temperatures such that the filter arrangement may be regenerated by heat.

2. The exhaust gas filter assembly of claim 1 wherein the housing has a generally parallel-piped configuration and includes at least one removable housing closure plate to provide access to the filter arrangement.

3. The exhaust gas filter assembly of claim 1 wherein the housing further comprises an inlet chamber which is partitioned by a baffle into an outer inlet chamber communicating with the inlet pipe and an inner inlet chamber communicating with the inlet cells, said baffle having perforations which communicate between the inner and outer inlet chambers and being comprised of material that is resistant to high temperatures such that the filtering arrangement may be regenerated by heat.

4. The exhaust gas filter assembly of claim 1 wherein the inlet cells, filter elements, and outlet cells are compressed between impervious end means.

5. The exhaust gas filter assembly of claim 1 wherein the filter arrangement includes first and second opposite endplates, rod means which extends from the first endplate through the inlet cells, outlet cells, and filter elements to the second end plate, and connector means attached to the rod means for compressing the inlet cells, outlet cells, and filter elements together.

6. The exhaust gas filter assembly of claim 1 wherein the filter elements comprise quartz fibers, borosilicate-E fibers, aluminosilicate fibers, or chromium-containing aluminosilicate fibers.

7. The exhaust gas filter assembly of claim 1 wherein the microporous filter elements comprise compressible elements.

8. The exhaust gas filter assembly of claim 1 wherein the microporous filter elements comprise graded filter media.

9. The exhaust gas filter assembly of claim 1 wherein a portion of each filter element extends past the inlet and outlet cells.

10. The exhaust gas filter assembly of claim 1 wherein the filter arrangement further comprises at least one filter support element disposed adjacent each microporous filter element.

11. The exhaust gas filter assembly of claim 10 wherein each microporous filter element and associated filter support element extends past the inlet and outlet cells into an inlet chamber communicating with the inlet pipe.

12. The exhaust gas filter assembly of claim 10 wherein the filter support elements comprise wire mesh.

13. The exhaust gas filter assembly of claim 12 wherein the wire mesh is sintered.

14. The exhaust gas filter assembly of claim 1 wherein each inlet cell has first and second ends, the first end being thicker than the second end.

15. The exhaust gas filter assembly of claim 1 wherein each outlet cell has first and second ends, the first end being thicker than the second end.

16. The exhaust gas filter assembly of claim 1 further comprising an insulating material which is resistant to high temperatures and is coupled to the housing.

17. The exhaust gas filter assembly of claim 1 wherein the microporous filter elements comprise materials that are resistant to temperatures at least as high as 1200° F.

18. The exhaust gas filter of claim 1 wherein the microporous filter elements comprise materials that are resistant to temperatures at least as high as 1500° F.

19. The exhaust gas filter of claim 11 further comprising a plurality of filter support elements wherein each one of said plurality of filter elements is sandwiched between a pair of said plurality of filter support elements forming a filter assemblage and each filter assemblage is sandwiched between one of said plurality of inlet cells and one of said plurality of outlet cells.

20. The exhaust gas filter of claim 19 wherein the plurality of support elements include woven wire mesh and the filter element includes a fibrous material.

21. The exhaust gas filter assembly of claim 1 wherein said filter arrangement further comprises a plurality of porous filter support elements disposed adjacent to the microporous filter elements, the porous filter support elements being alternately arranged with at least one filter element disposed between first and second filter support elements and wherein each of the plurality of inlet cells of said filter arrangement includes a plurality of inlet apertures and each of the plurality of outlet cells of said filter arrangement includes a plurality of outlet apertures, the microporous filter elements including quartz fibers, borosilicate-E fibers, aluminosilicate fibers, or chromium-containing aluminosilicate fibers and wherein the plurality of filter supports include wire mesh having a mesh size of 100 mesh, 90×100 mesh or 70 mesh.

* * * * *

UNITED STATES PATENT AND TRADEMARK OFFICE
CERTIFICATE OF CORRECTION

PATENT NO. : 5,470,364
DATED : November 28, 1995
INVENTOR(S) : Adiletta

It is certified that error appears in the above-indentified patent and that said Letters Patent is hereby corrected as shown below:

Column 14, Line 41, change "11" to --1--;

Signed and Sealed this

Twenty-eighth Day of May, 1996

Attest:

BRUCE LEHMAN

*Attesting Officer*  *Commissioner of Patents and Trademarks*